(12) United States Patent
Roholt (10) Patent No.: US 11,571,287 B1
(45) Date of Patent: Feb. 7, 2023

(54) SYSTEM FOR REMOVING AEROSOL CONTAMINANTS CREATED DURING A MEDICAL OR DENTAL PROCEDURE

(71) Applicant: David H. Roholt, Auburn, CA (US)

(72) Inventor: David H. Roholt, Auburn, CA (US)

( * ) Notice: Subject to any disclaimer, the term of this patent is extended or adjusted under 35 U.S.C. 154(b) by 0 days.

(21) Appl. No.: 17/676,151

(22) Filed: Feb. 19, 2022

Related U.S. Application Data (63) Continuation of application No. 17/231,990, filed on Apr. 15, 2021, now abandoned.

(60) Provisional application No. 63/078,888, filed on Sep. 15, 2020, provisional application No. 63/021,596, filed on May 7, 2020, provisional application No. 62/497,355, filed on Apr. 19, 2020.

(51) Int. Cl.
*A61C 19/00* (2006.01)
*B08B 15/04* (2006.01)
*A61C 17/06* (2006.01)

(52) U.S. Cl.
CPC .......... *A61C 19/007* (2013.01); *A61C 17/065* (2019.05); *B08B 15/04* (2013.01)

(58) Field of Classification Search
CPC ....... A61C 19/007; A61C 19/00; A61C 17/04; A61C 17/065; A61C 17/06; A61C 17/135; B08B 15/04; A61G 15/14; A61G 15/10; A61G 13/108; Y10S 128/91; A61L 9/00; A61B 90/40; A61B 2090/401; A61M 16/009
See application file for complete search history.

(56) References Cited

U.S. PATENT DOCUMENTS

| | | | | |
|---|---|---|---|---|
| 5,513,632 A | * | 5/1996 | Nepon | A61M 16/009 128/200.28 |
| 6,406,294 B1 | * | 6/2002 | Bell | A61G 15/14 433/80 |
| 2004/0158120 A1 | * | 8/2004 | Paranjpe | B08B 15/026 600/21 |
| 2010/0297577 A1 | * | 11/2010 | Cohen | A61M 1/79 210/85 |
| 2021/0338396 A1 | * | 11/2021 | Crohin | A61C 17/06 |

FOREIGN PATENT DOCUMENTS

TW         M458945 U   *   8/2013   .............  A61C 17/06

* cited by examiner

*Primary Examiner* — Jacqueline T Johanas
*Assistant Examiner* — Shannel Nicole Belk (57) ABSTRACT

A system for removing aerosol contaminants from the air in a room is disclosed. The system comprises a vacuum inlet coupled to a vacuum system and operable to draw air from nearby into the vacuum system, filter out aerosol contaminants present in the air, and return the filtered air back into the room. The system includes airways internal to a dental chair, through which air may be drawn and filtered. The system may be used near a patient during a dental or medical procedure to remove aerosol and splatter potentially containing such contaminants as COVID-19 and other infectious diseases.

5 Claims, 11 Drawing Sheets

SYSTEM FOR REMOVING AEROSOL CONTAMINANTS CREATED DURING A MEDICAL OR DENTAL PROCEDURE

CROSS-REFERENCE TO RELATED APPLICATIONS

This application claims the benefit of U.S. Provisional Patent Application No. 63/078,888, filed Sep. 15, 2020; U.S. Provisional Patent Application No. 63/021,596, filed May 7, 2020; and U.S. Provisional Patent Application No. 62/497,355, filed Apr. 19, 2020, and U.S. patent application Ser. No. 17/231,990, filed Apr. 15, 2021, all of which are incorporated by reference herein in their entirety.

FIELD OF THE INVENTION

The present invention generally relates to dental and medical procedures, and in particular, a system for removing aerosol contaminants created during a procedure.

BACKGROUND

This disclosure is directed towards various embodiments related to vacuum equipment used in dental offices to improve environmental hygiene so as to lessen the possibility of doctors and nursing staffs from contracting infectious diseases, such as COVID-19.

Figure 1:
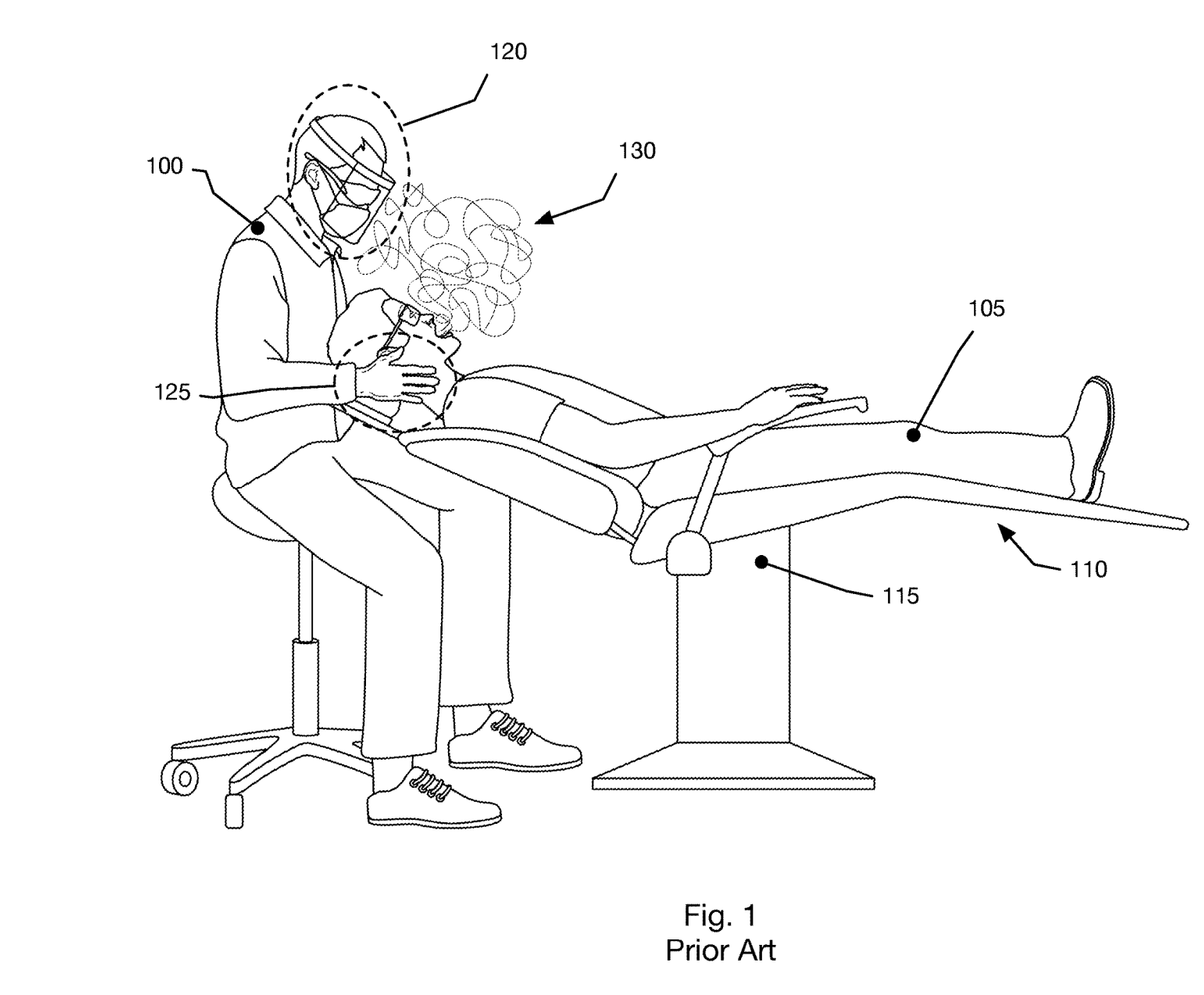
FIG. 1 is a prior art diagram of a Dental Health Professional ("DHP") administering a dental procedure to a patient and producing a cloud of aerosol and splatter.

Referring first to FIG. 1, a common prior art dental office configuration is shown. A Dental Health Professional 100 (hereinafter "DHP") is shown treating a patient 105. During the heightened concern surrounding COVID-19, the DHP 100 may be shown wearing various Person Protection Equipment ("PPE") 120, such as masks, face shield, eye protection, and the like. The DHP 100 must also be wearing protective gloves 125.

As can be seen from FIG. 1, the patient 105 is typically resting on a table 110 raised in place by a base 115 to a height suitable for the DHP 100 to properly attend to the patient 105.

Most dental procedures that use mechanical instrumentation will produce airborne particles from the site where the instrument is used, referred to herein as aerosol or splatter. In FIG. 1, this aerosol is shown as an aerosol cloud 130.

Dental handpieces, ultrasonic scalers, air polishers and air abrasion units produce the most visible aerosols. Each of these instruments removes material from the operative site that becomes aerosolized by the action of the rotary instrument, ultrasonic vibrations or the combined action of water sprays and compressed air. The water spray, mixed with saliva, tooth structure, bacteria, viruses and fungi is the portion of the aerosol that is most visible to the naked eye and may be noticed by the patient and dental personnel and contains potentially infectious particles. Such particles (aerosols) can remain airborne for many minutes and travel throughout the dental treatment room and to other areas in a dental office.

As will be appreciated from FIG. 1, this aerosol cloud 130 may linger directly in front of the DHP's face, and the DHP may be at risk of inhaling aerosol or having aerosols land on their person, hair, exposed skin or on surfaces in the dental treatment room from the cloud 130, no matter what type of PPE the DHP may be employing during the procedure.

To exacerbate the situation, typical HVAC systems may draw and recirculate ambient air in the room up towards a vent located in the ceiling, thereby drawing the aerosol cloud 130 directly towards the DHP, further exposing personnel to potentially infectious contaminants in the cloud 130.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 2:
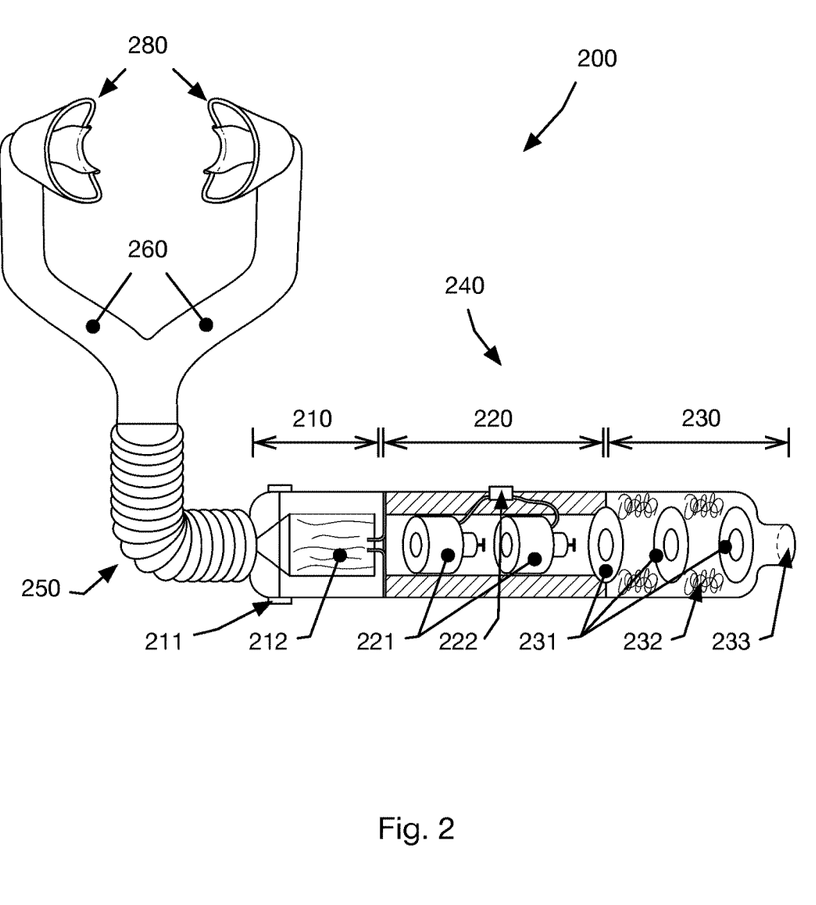
FIG. 2 is partial cut-away illustration of an aerosol removing system for removing aerosol contaminants from the location of a dental procedure in accordance with the teachings of this disclosure.

Referring now to FIG. 2, partial cut-away illustration of an aerosol removing system 200 for removing aerosol contaminants from the location of a dental procedure in accordance with the teachings of this disclosure.

Moving from the upper left to the lower right of FIG. 2, the aerosol removing system 200 includes a pair of vacuum inlets 280, each coupled to a y-shaped intake tube 260. The intake tube 240 is coupled to a flexible tubing 250, which is in turn coupled to a vacuum base unit 240.

In operation, the vacuum base unit 240 is configured to create a vacuum within the flexible tubing 250, the y-shaped intake 260, and ultimately at the vacuum inlets 280. The pair of vacuum inlets 280 are placed about a patient's head and proximate to the location of a dental procedure. They aerosol removal system is preferably configured to create a sufficient negative pressure proximate to the location of the dental procedure such that aerosols emanating from the dental procedure location are drawn into the vacuum inlets 280, through the y-shaped intake tube 260 and flexible tubing 250, and into the vacuum base unit 240.

Within the vacuum base unit, aerosols and splatter are filtered from the air, and filtered air is returned to the room in which the aerosol removal system is being used.

Referring to FIG. 2 and now in more operational detail, air is received into the filter assembly 210 under vacuum pressure as will be described below. It is to be understood that the received air represents air collected from an area proximate to the location of a dental procedure and may include aerosols and splatter therein potentially containing harmful contaminants.

Received air is directed about a filter 212. In one embodiment, the filter 212 comprises a HEPA filter. The filters 212 may be accessed, cleaned, or changed through a removable cap 211.

The vacuum base unit 240 further includes a motor assembly 220. The filter assembly 201 may be removably affixed to the motor assembly 220 using a threaded joint 214. Filtered air may be drawn into the motor unit 220 through an inlet 213.

The motor assembly include one or more motors 221 that may be operated through a control module 222.

The vacuum base unit 240 may also include a muffler assembly 230 coupled to the output of motor assembly 220. The muffler assembly 230 may include one or more muffler elements 231 and sound-absorbing material 232 dispersed throughout the muffler assembly 230. The filter air 234 may exit the vacuum base unit 240 through an exit 233.

Figure 3:
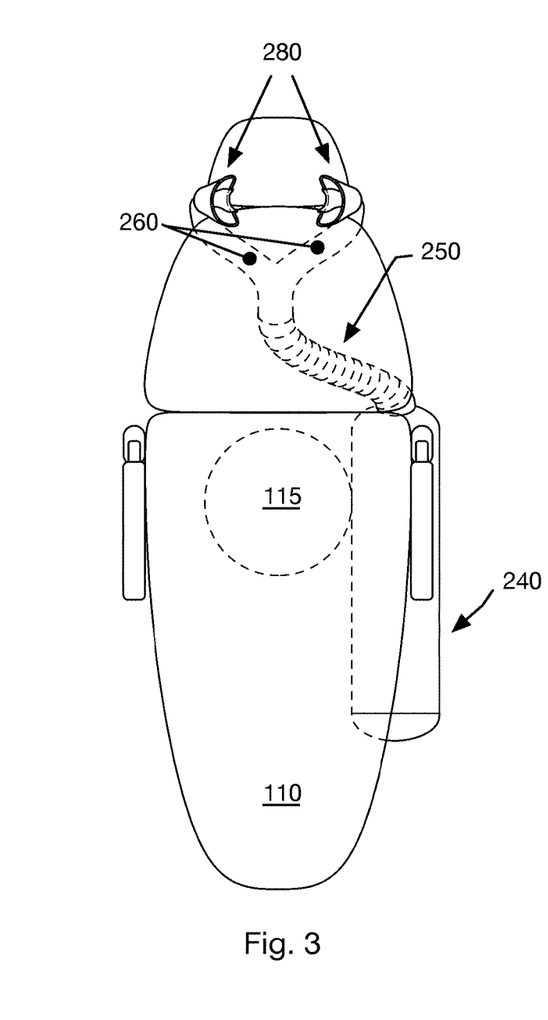
FIG. 3 is an overhead view of a system for removing aerosol contaminants from the location of a dental procedure placed about a dental patient chair station in accordance with the teachings of this disclosure
Figure 4:
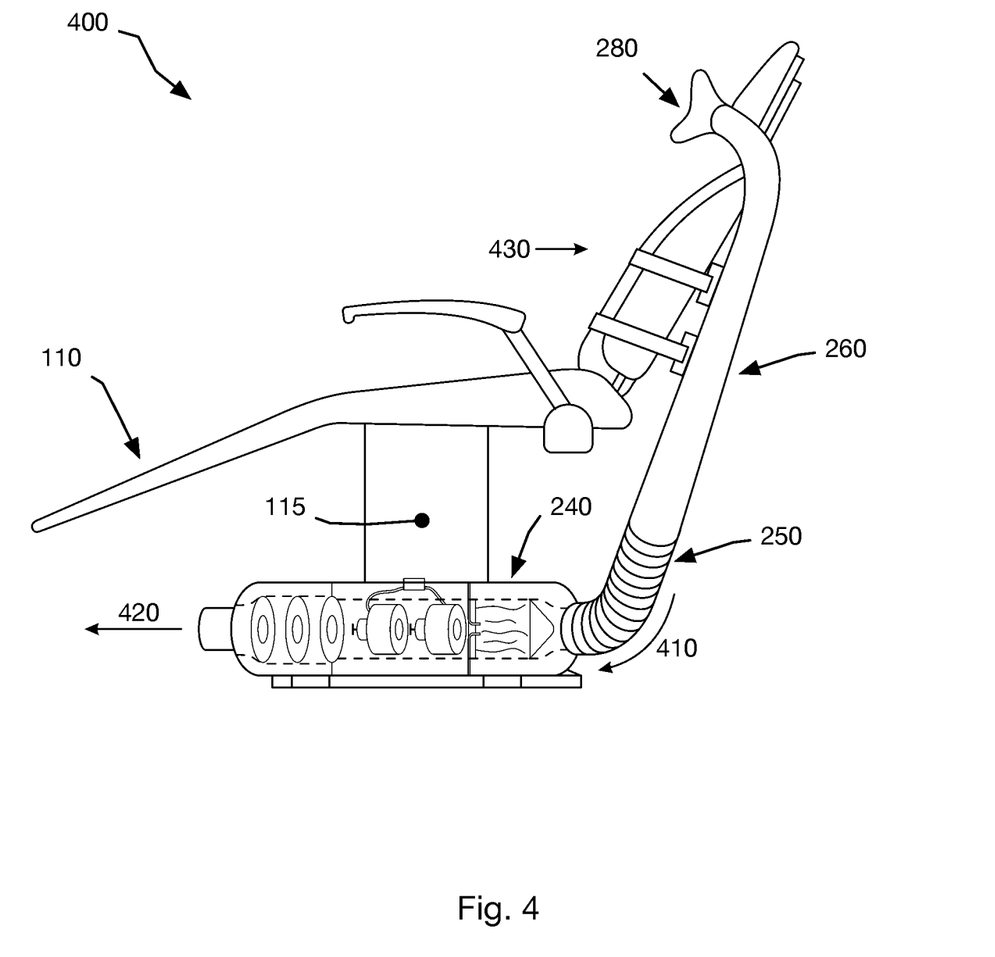
FIG. 4 is a side view of a system for removing aerosol contaminants from the location of a dental procedure placed about a dental patient chair station in accordance with the teachings of this disclosure

Referring now to FIGS. 3 and 4, the aerosol removal system 200 is shown being attached to the dental chair as shown and described in FIG. 1. The vacuum base unit 240 is shown being affixed under the dental chair 110 and adjacent to the base 115. The flexible tubing 250 and y-shaped intake 260 are shown being oriented such that the vacuum inlets 280 protrude over the top of the chair back proximate to either side of the patient and to the location of the dental procedure.

Referring to FIG. 4, vacuum inlets 280 capture air proximate to the patient, and direct the air along a direction 410, through the vacuum base unit 240, and filtered air is returned to the room out through exit 420.

As will be appreciated from FIG. 4, a patient is able to move freely through a direction 430 back and forth in the chair 110 without disturbing the arrangement of the air inlets 280.

Figure 5:
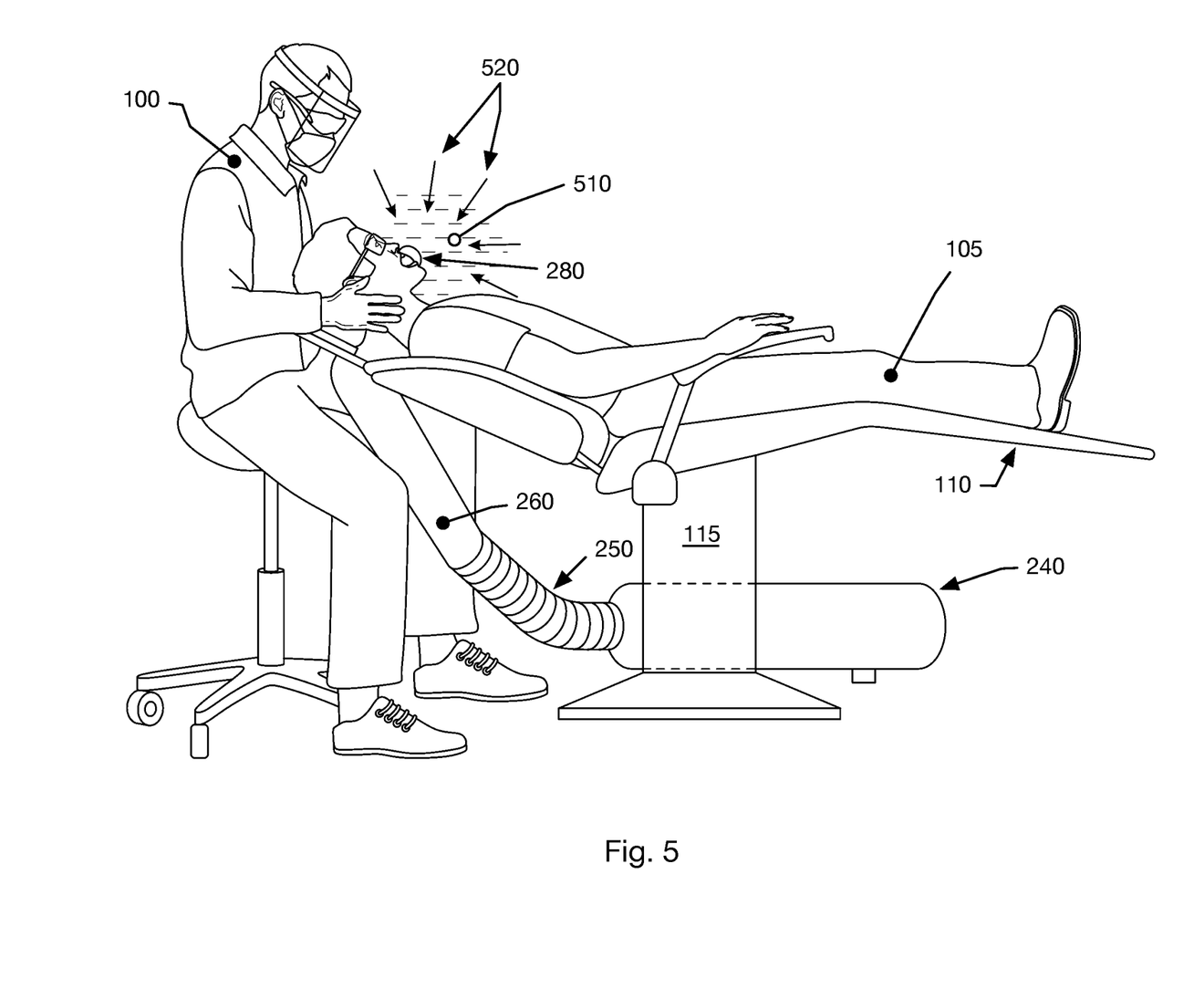
FIG. 5 is a diagram of a Dental Health Professional ("DHP") administering a dental procedure to a patient and producing a cloud of aerosol and splatter in accordance with the teachings of this disclosure.

Referring now to FIG. 5, an aerosol removal system as shown and described in this disclosure is shown in operation. FIG. 5 shows a DHP 100 performing a procedure on a patient 105. A negative air pressure zone is shown being created proximate to the patient 105 as represented by a cloud of negative symbols 510. This zone of negative pressure is formed proximate to the vacuum inlet 280, causing aerosol-containing air to be directed into the vacuum inlet 280 generally along a direction as shown by direction arrows 520. The received air is then directed into the y-shaped intake 260 and the flexible tubing 250 and into the vacuum base unit 240 for filtering and return to the room.

Figure 6:
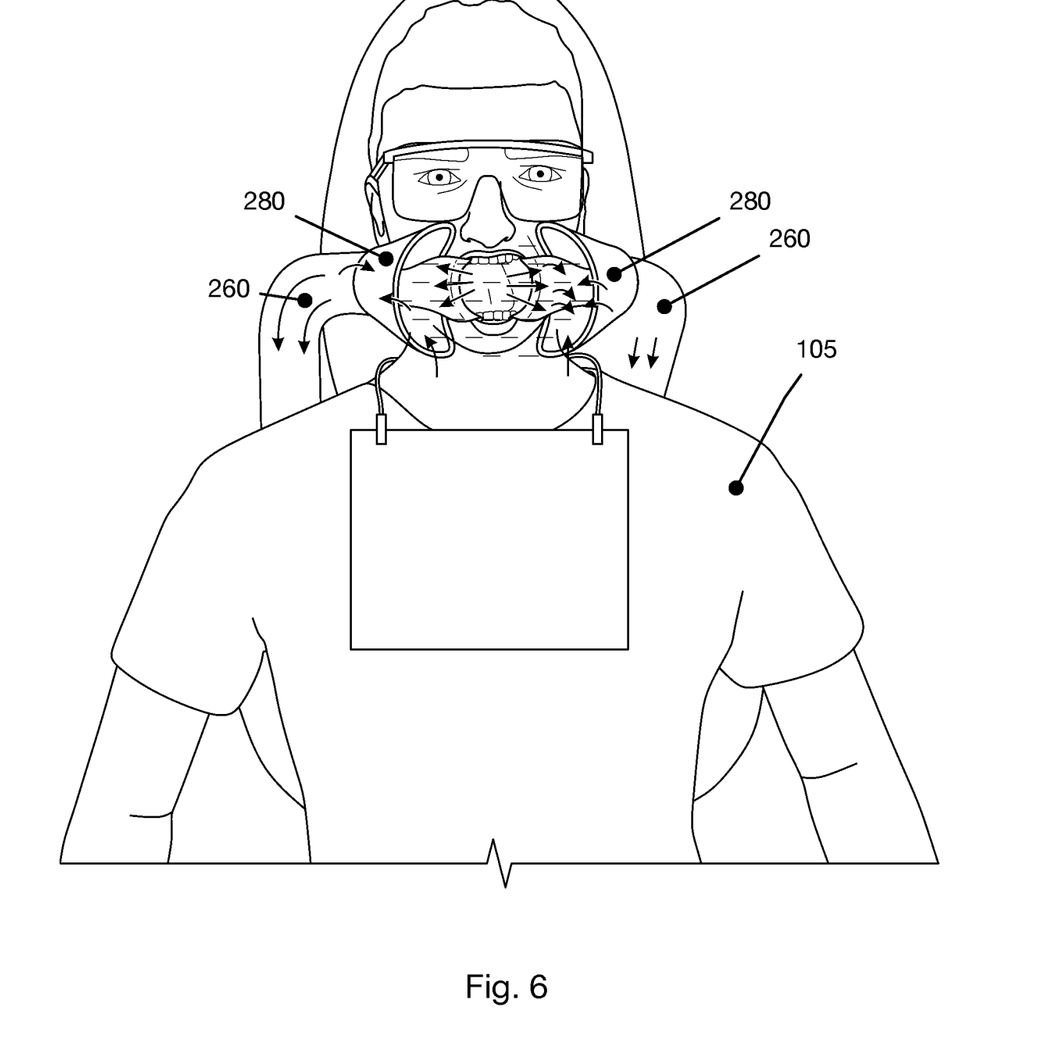
FIG. 6 is a front view of a patient during a dental procedure in accordance with the teachings of this disclosure.

Referring now to FIG. 6, yet another aerosol removal system as shown and described in this disclosure is shown in operation. FIG. 6 shows a patient 105 during a procedure. A negative air pressure zone is shown being created proximate to the patient 105 as represented by a cloud of negative symbols surrounding the patient's mouth. This zone of negative pressure is formed proximate to the pair of vacuum inlets 280, causing aerosol-containing air to be directed into the vacuum inlet 280 generally along a direction as shown by direction arrows. The received air is then directed into the y-shaped intake 260 and directed into the vacuum base unit (not shown) for filtering and return to the room.

Figure 7:
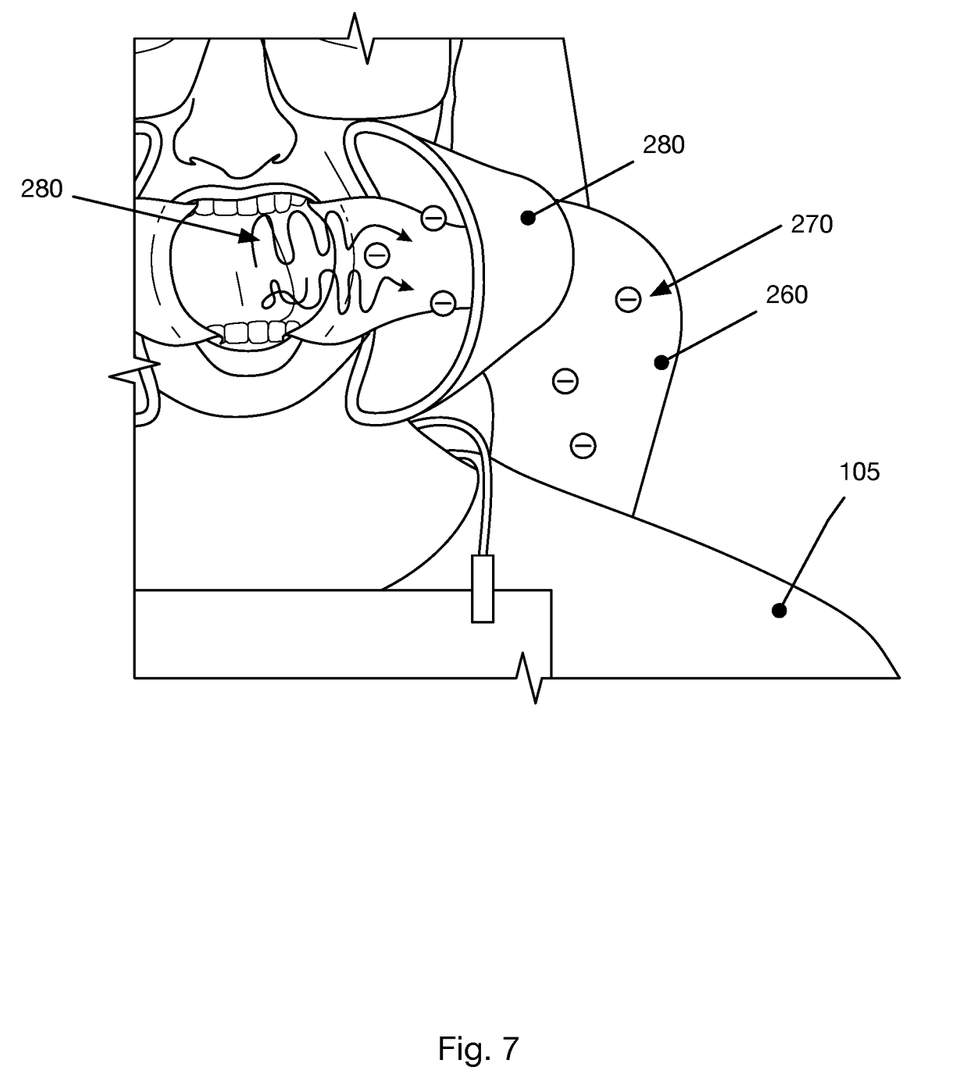
FIG. 7 is a close-up view of a patient during a dental procedure in accordance with the teachings of this disclosure.

FIG. 7 is a close-up of one side of the patient 105 and a corresponding vacuum inlet nozzle 280 and portion of y-shaped inlet 260. The negative air pressure zone is shown being created proximate to the patient 105 as represented by a cloud of negative symbols 270 surrounding the patient's mouth. This zone of negative pressure causes aerosol-containing air to be directed into the vacuum inlet nozzles 280 generally along a direction as shown by direction arrows 280. The received air is then directed into the y-shaped intake 260 and directed into the vacuum base unit (not shown) for filtering and return to the room.

In one aspect of this disclosure, the shape of the vacuum inlet nozzles 180 is formed to maximize the airflow away from the patient and into the nozzle, while being shaped to fit around the face and be as close to the mouth without being in the way of the dentist or hygiene/assistant. This increases the airflow which increases the distance at which it effectively pulls in aerosols, droplets and splatter. In one embodiment, test aerosols were caused to flow toward the vacuum inlet nozzles 180 from at least 18 inches away.

Figure 8:
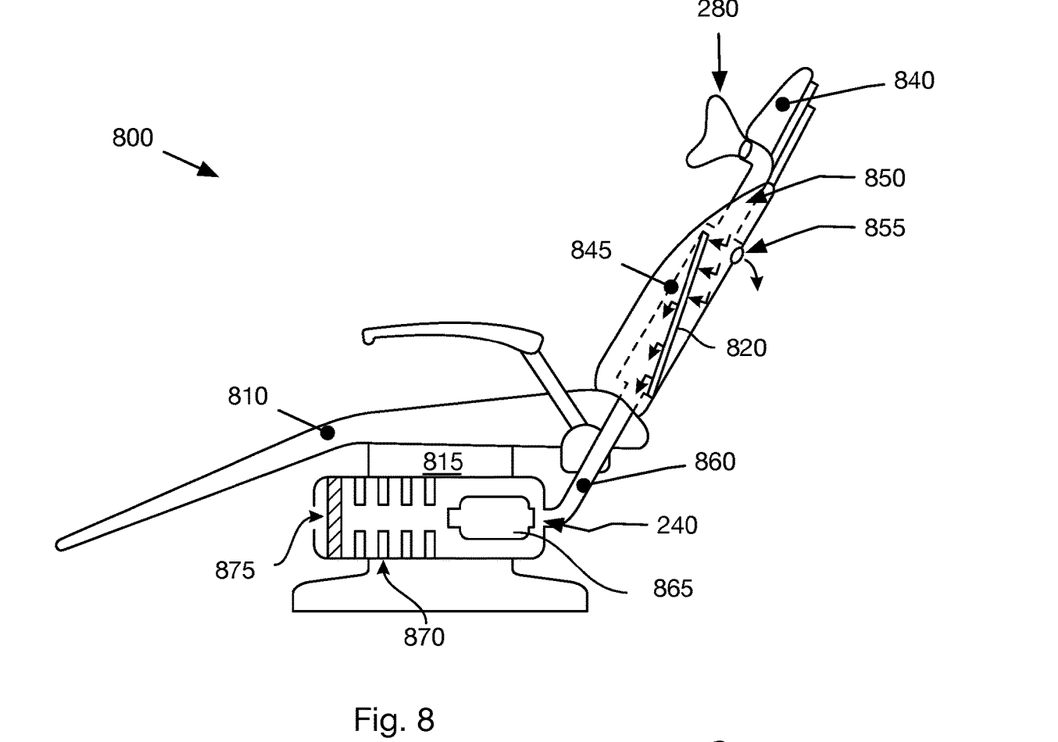
FIGS. 8, 9 and 10 are diagrams of an aerosol removal system integrated into a patient chair in accordance with the teachings of this disclosure.

FIG. 8 is a conceptual illustration of an aerosol removal system 800 integrated into a dental chair. The system 800 includes a patient chair base 810 mounted on a base 815. The system 800 also includes a chair back 840 including a cavity 845 formed therein. Within the cavity 845, an airway 850 is formed. A vacuum inlet nozzle 280 as shown and described may be coupled to the airway 850.

Figure 9:
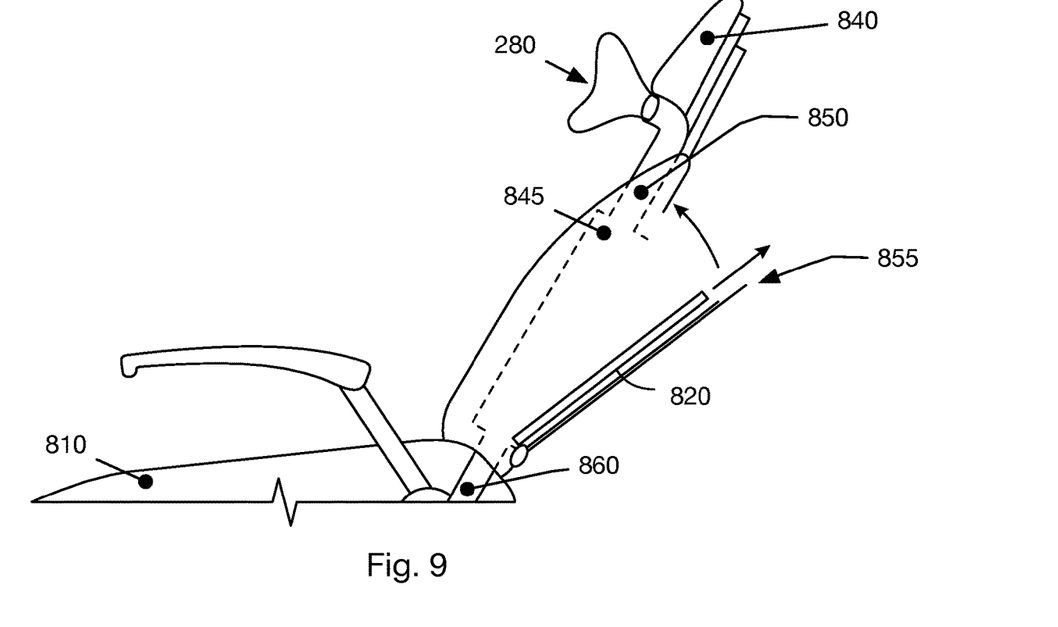

Within the cavity 845 a HEPA filter 820 may be positioned in the airway 850 to received air and pass filtered air to the tubing 860 and in turn to the vacuum base unit 240 as shown and described herein. The HEPA filter 820 may be removed and replaced using a latch 855 for access as shown in FIG. 9. Other designs may include access to the HEPA filter from the side of the dental chair (not shown) or configured into the base of the dental chair (not shown).

Moreover, it is contemplated that the HEPA filter and motor units as shown and described above may be completely encased within the patient chair enclosure. It is further contemplated that one or more air purification systems may be included in the air path of the present disclosure. Such purification systems may be chosen to operate in conjunction with the HEPA filter of this disclosure, such as photocatalytic, plasma, UV light filters, electric air purifiers, ionizing light sources, and the like.

In one embodiment, the present system may be configured to operate at a low level for purifying air in a room filtration mode, and then boosted to an operating level for use during a procedure.

The vacuum base unit 240 may include a vacuum motor 865, muffler noise reduction 870, and diffusers 875 to reduce noise and turbulence in the operating room.

Figure 10:
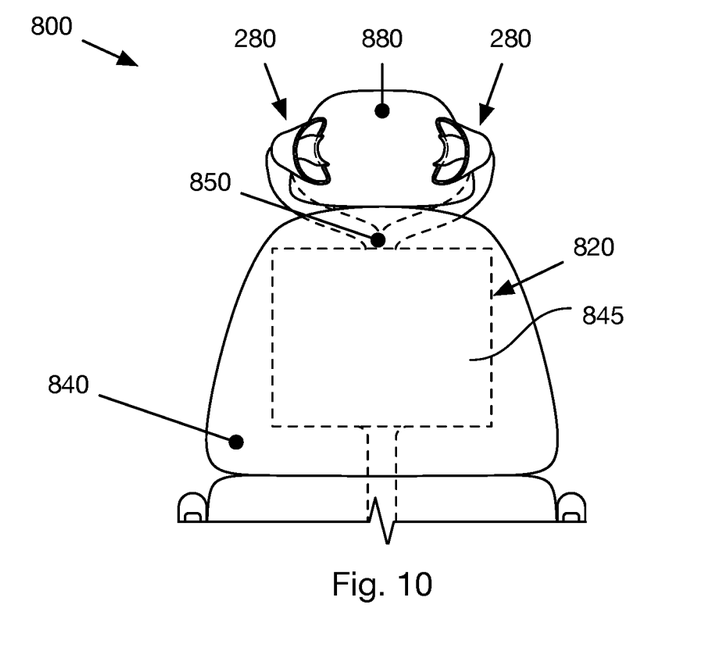

FIG. 10 is a front view of a conceptual illustration of an aerosol removal system 800 integrated into a dental chair. The system 800 a chair back 840 including a cavity 845 formed therein. Within the cavity 845, an airway 850 is formed. A pair of vacuum inlet nozzles 280 as shown and described is show aligned about the sides of the headrest 880, and may be coupled to the airway 850.

Figure 11:
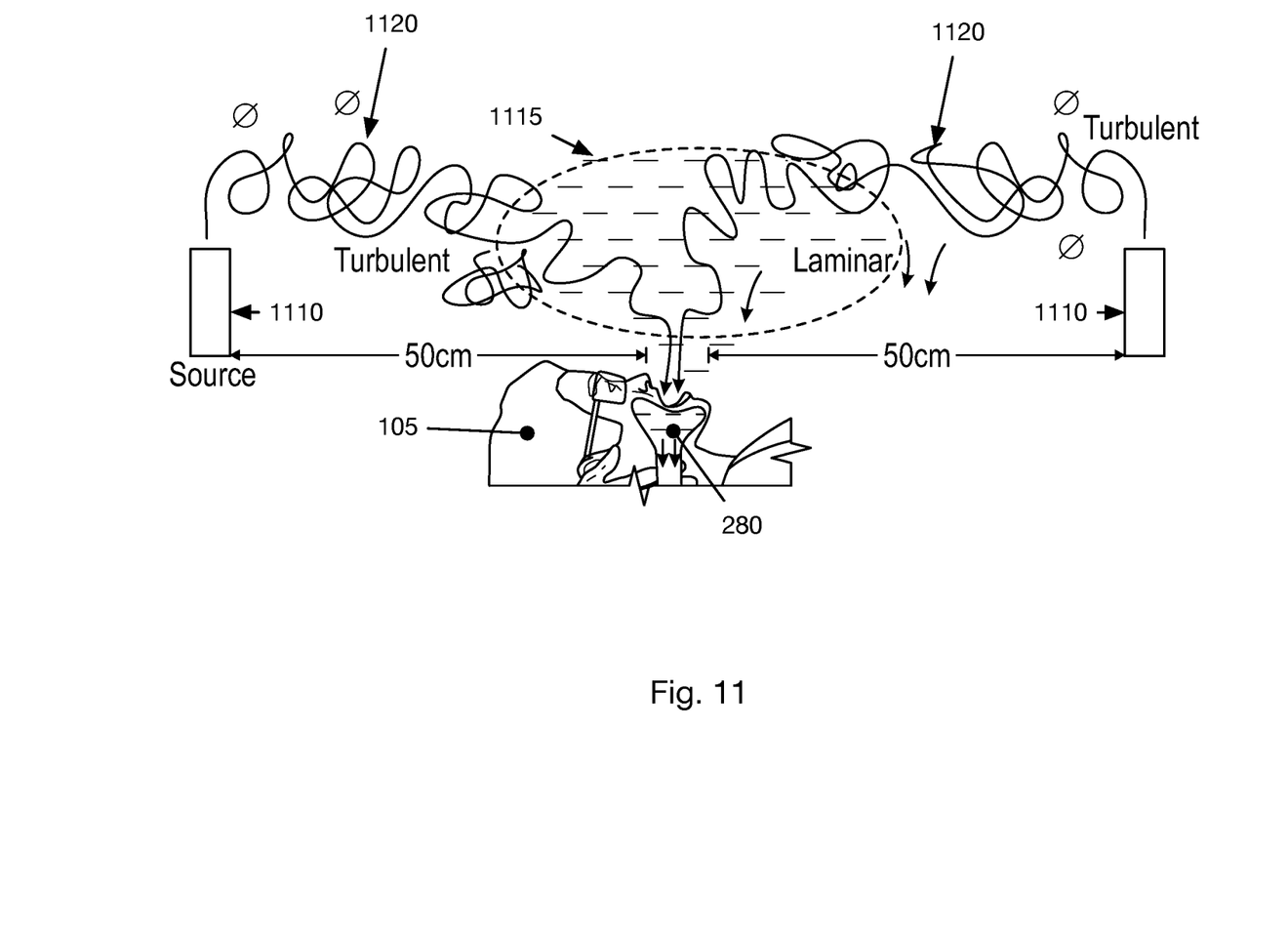
FIG. 11 is a conceptual drawing showing one aspect of testing the flow of aerosols near the site of a dental procedure in accordance with the teachings of this invention.

FIG. 11 is a conceptual drawing showing one aspect of testing the flow of aerosols near the site of a dental procedure in accordance with the teachings of this invention. FIG. 11 shows a patient 105 positioned with a vacuum intake nozzle 280 located proximate to the head of the patient 105. A set of aerosol sources 1110 are positioned approximately 50 cm away and configured to emit aerosols typical of those ejected during a typical dental procedure.

Near the site of the sources 1110, a turbulent area is created and shown as arrows 1120. In this turbulent area 1120, aerosols may be suspended and linger near the patient and dental health professionals as in the prior art, creating a potential infection risk for those exposed to these aerosols.

However, as shown in FIG. 11, a negative pressure zone 1115 is created by the vacuum intake nozzles 280. As a result of the vacuum force supplied by the vacuum base unit (not shown), a laminar flow pattern is created within the negative pressure zone 115, causing aerosols present in the air to be drawn into the intake nozzle 280, away from the patient and dental health professionals.

To test the efficacy of embodiments according to this disclosure, a test was commissioned through the Medical University of South Carolina, School of Dentistry ("MUSC"). MUSC has developed a systematic approach to testing aerosol reduction devices. In one such test, an embodiment according to this disclosure was tested according to their standard protocols by comparing a Control device (C) and Control device with High Volume Evacuation (C+HVE) to an embodiment of this disclosure, known as "ASA" and ASA+HVE (ASA+HVE).

The test compared different sizes of debris generated during dental procedures: Aerosols (aerosol particle PM2.5, whose diameter is 2.5 μm or smaller) and Splatter (larger particles that can contain blood, saliva, bacteria, fungi and virus particles 3 μm to over 150 μm).

According to the CDC guidelines, particle size determines the drift time in air. For example, a 0.5 μm particle can remain airborne for 41 hours, a 1.0 μm particle for 12 hours, a 3 μm particle for 1.5 hours, a 10 μm particle for 8.2 min., and a 100 μm particle for only 5.8 seconds. Because of drift time, it is critical to remove the majority of aerosols and larger particles immediately from the area surrounding the point of generation, typically the oral cavity. Delaying filtration of the aerosols, increases the chance that aerosols can drift to other parts of a dental treatment room and beyond.

The test showed that ASA by itself, and with HVE (ASA+HVE), compared to the control (C and C+HVE), reduced splatter by approximately 50% (C vs. ASA=−47% and C+HVE vs. ASA+HVE=−62%).

When comparing aerosol reduction during simulated crown preparation (a procedure that generates a great deal of aerosols and turbulence due to high pressure air mixed with water spray), ASA performed significantly better (C=2236.2 mg/m$^3$ of aerosolized particles vs. ASA=292.54 mg/m$^3$), an 87% reduction and when combined with HVE, ASA removed substantially all or 100% of aerosols. (C+HVE=171 mg/m$^3$ vs. ASA+HVE=0).

This is of particular importance because as an aerosol reduction device is moved further from the oral cavity, the ability to deflect the path of aerosols, splatter and droplets decreases by the square of the distance and the size and/or direction of travel of larger particles.

As is known in the art, as the distance from the vacuum nozzle increases, airflow decreases by the square of the distance. Additionally, the greater the particle size, the more energy is required to redirect the direction of travel. Therefore, it is desirable to have the vacuum nozzles very close to the source.

For example, larger evacuator nozzles (i.e., 4" diameter) that are typically positioned above the oral cavity so as to remain out of the way due to visibility and operator hands and instruments and are positioned 20-30 cm from the mouth, would require airflow volume that is 1000× greater than nozzles positioned 2-3 cm from the oral cavity.

Accordingly, in another embodiment of this disclosure, contoured, dual orifice vacuum nozzles are provided that are designed to fit about the oral cavity and are shaped to maximize proximity to the oral cavity without interfering with operator hand and instrument positioning. As can be seen in FIG. 6, exemplary nozzles 280 are provided to form-fit about the patient 105 and especially the face, allowing optimum airflow about the area of the procedure and into the device of this disclosure.

Another consideration of this disclosure are airflow patterns around DHCPs. Such patterns may be dictated by airflow patterns in the room (e.g., from movement pf persons in the room, HVAC vents, air filters, etc.), from the volume and speed of aerosols generated by high-speed hand pieces (e.g., water spray mixed with air), as well as by devices that capture aerosols generated during dental treatment.

External venting of stand-alone devices requires diffusers to reduce turbulence. Reducing turbulence is important because it is desirable to lessen any disturbance of surrounding air and thus causing air proximate to the work site to be more still. Additionally, the use of desktop air filtering devices can add turbulence to a room, and increase the airborne spread of turbulents. By reducing room turbulence, a larger zone of reduced air pressure can be created more effectively around the oral cavity. This influenced the drift of small aerosolized particles toward the vacuum tubes and away from DHCP.

During testing, the diffuser built into one embodiment of this disclosure reduced room turbulence and thus was capable of creating a large zone of undisturbed air and a larger area of lower pressure around the oral cavity, thereby causing airflow toward the nozzles from a distance of 50 cm.

Figure 12:
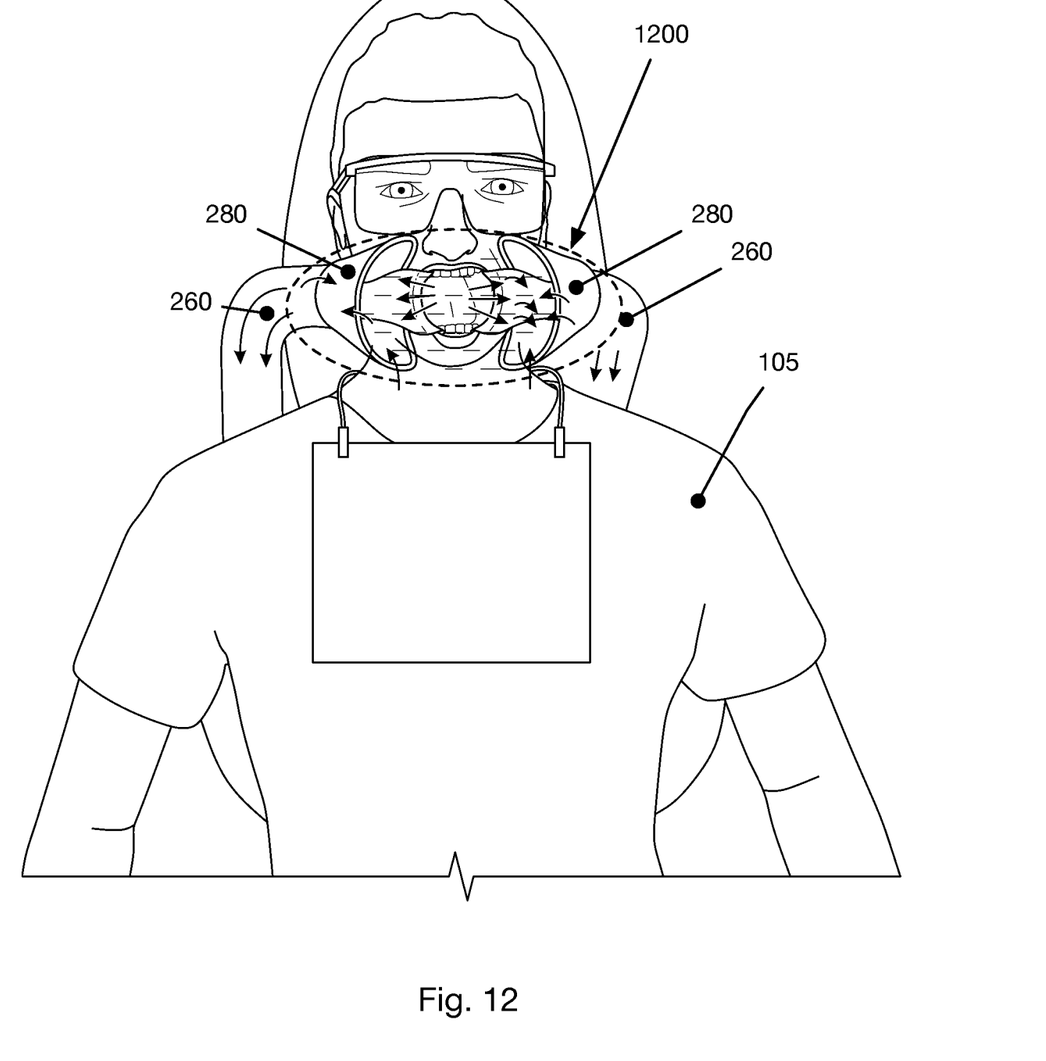
FIG. 12 is a conceptual drawing showing various flow patterns of aerosols into inlets near the site of a dental procedure in accordance with the teachings of this invention.

Referring now to FIG. 12, the illustration of FIG. 6 is shown with the addition of an ideal negative pressure zone 1200. In FIG. 12, an ideal negative pressure gradient zone 1200 is created when aerosols generated by the dental procedure are generally directed away from both the patient 105 and DHCPs present, and into the aerosol removal system of this disclosure.

In one embodiment, the ideal negative pressure zone 1200 is of a negative pressure gradient sufficient to remove aerosol contaminants having a particle diameter of approximately 0.25 μm.

Figure 13:
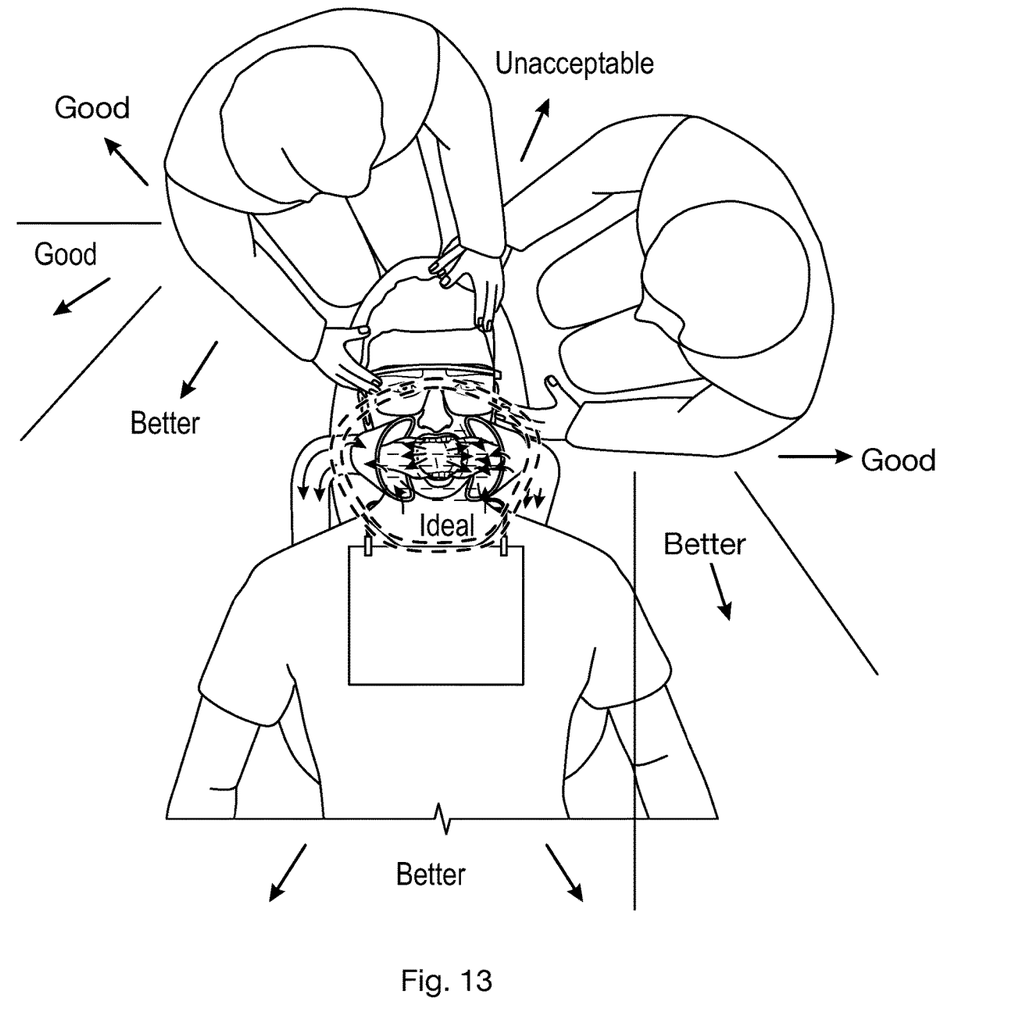
FIG. 13 is a conceptual drawing showing various flow patterns of aerosols near the site of a dental procedure and about caregivers in accordance with the teachings of this invention.

Referring now to FIG. 13, an illustration is shown with two caregivers attending to a patient is shown. The illustration includes a pair of intake nozzles as shown and described throughout this disclosure. FIG. 13 include vector arrows labeled "IDEAL", "GOOD", "BETTER", and "UNACCEPTABLE", describing the desired path that aerosols and/or splatter may travel in accordance with this disclosure. In an IDEAL scenario, the aerosols are drawn from the procedure area directly into the intake inlets, and do not get near caregivers. In a BETTER scenario, the aerosols and/or splatter may drift a short distance away from the procedure site, but still in a direction generally away from the caregivers. In a GOOD scenario, the aerosols and/or splatter may travel a short distance away from the procedure site but in a direction adjacent to the caregivers. In an UNACCEPT- ABLE scenario, the aerosols and/or splatter travel away from the procedure site and into the caregivers, risking infection.

In accordance with this disclosure, it is desired that the aerosol removal system be configured to prevent an UNACCEPTABLE scenario during a procedure, and provide as close to an IDEAL scenario as possible.

While this disclosure has been directed towards the dental industry, it is to be appreciated that the aerosol removal systems as shown and described herein may be employed wherever airborne contaminants such as aerosols and splatter are desired to be removed from a location proximate to a patient and those administering the procedure, whether dental, medical, or otherwise.

While preferred embodiments of the present invention have been shown and described herein, such embodiments are provided by way of example only. Numerous variations, changes, and substitutions will now occur to those skilled in the art without departing from the invention as recited in the claims as amended. It should be understood that various alternatives to the embodiments of the invention described herein may be employed in practicing the invention.

What is claimed is:

1. A system for removing aerosol contaminants from the location of a dental procedure taking place in a room, the system comprising:
    a dental chair, the dental chair having a cavity formed therein;
    a vacuum base unit affixed to a base of the dental chair;
    a pair of inlet tubes oriented so as to protrude over a back of the dental chair and configured to be located proximate to either side of a patient's face and configured to be oriented near the location of the dental procedure;
    the pair of inlet tubes and the vacuum base unit each being operatively coupled through an airway flowing with the cavity formed in the dental chair;
    the vacuum base unit adapted to create a negative air pressure proximate to the dental procedure location and draw aerosol contaminants into the pair of inlets and into the cavity in the dental chair through the airway;
    the aerosol contaminants being drawn through a filter disposed in the cavity of the dental chair, and filtered air is released back into the room;
    wherein the cavity of the dental chair is accessible for the removal and replacement of the filter; and
    wherein the patient reclining in the dental chair may move freely back and forth without disturbing the orientation the inlet tubes.

2. The system of claim 1, wherein the aerosol contaminants comprise particles having a particle diameter of greater than or equal to approximately 0.3 μm.

3. The system of claim 1, wherein the aerosol contaminants comprise particles having a particle diameter of greater than or equal to approximately 0.25 μm.

4. The system of claim 1, wherein the system is configured to cause airflow toward the pair of inlet tubes from a distance of approximately 50 cm.

5. The system of claim 1, wherein the vacuum unit is completely encased within the dental chair enclosure.

* * * * *